United States Patent
Lee et al.

(10) Patent No.: US 8,351,557 B2
(45) Date of Patent: Jan. 8, 2013

(54) CIRCUIT FOR DETECTING CLOCK AND APPARATUS FOR PROVIDING CLOCK

(75) Inventors: Tsung-Hsi Lee, Taipei (TW); Hung-Jen Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 904 days.

(21) Appl. No.: 12/468,248

(22) Filed: May 19, 2009

(65) Prior Publication Data

US 2010/0128831 A1 May 27, 2010

(30) Foreign Application Priority Data

Nov. 27, 2008 (CN) .......................... 2008 1 0181620

(51) Int. Cl.
*H04L 7/00* (2006.01)
(52) U.S. Cl. ........................................ 375/354; 375/355
(58) Field of Classification Search .................. 375/354, 375/355, 359, 316; 327/18, 19, 293, 295
See application file for complete search history.

(56) References Cited

U.S. PATENT DOCUMENTS

| 5,642,380 | A   | * | 6/1997  | Lambert ......................... 375/223 |
| 6,538,504 | B1  | * | 3/2003  | Kirn ................................. 330/10 |
| 2003/0226054 | A1 | * | 12/2003 | Benno et al. .................. 713/500 |

* cited by examiner

*Primary Examiner* — Khai Tran
(74) *Attorney, Agent, or Firm* — J.C. Patents

(57) ABSTRACT

A circuit for detecting a clock has a plurality of first transmission elements, a plurality of first exclusive OR gates and a first AND gate. Each first transmission element is coupled to a last first transmission element for receiving output data, and the data received by each first transmission element is transmitted to an input terminal of a next first transmission element. In addition, the input of a first transmission element is coupled to a clock source for receiving a predetermined clock signal of which a frequency is less than a frequency of a local clock signal. Furthermore, the first and second input terminals of a $k^{th}$ exclusive OR gate are coupled to output terminals of a $k^{th}$ and a $(k+1)^{th}$ first transmission elements, wherein k is an integer greater than 0 smaller than a total number of the first transmission elements.

12 Claims, 5 Drawing Sheets

CIRCUIT FOR DETECTING CLOCK AND APPARATUS FOR PROVIDING CLOCK

CROSS-REFERENCE TO RELATED APPLICATION

This application claims the priority benefit of Chinese application Serial No. 200810181620.4, filed on Nov. 27, 2008. The entirety of the above-mentioned patent application is hereby incorporated by reference herein and made a part of this specification.

BACKGROUND OF THE INVENTION

1. Field of the Invention

The present invention relates to a circuit for detecting clock and more particularly, to a clock detecting circuit for detecting whether the clock signal works normally.

2. Description of Related Art

FIG. 1 illustrates a block diagram of a conventional system with a shared clock source. Referring to FIG. 1, a conventional system 100 with a shared clock source includes devices 102, 104, 106, and 108 all coupled to a clock source 110. Accordingly, the clock source 110 simultaneously provides clock signals required by the devices 102, 104, 106, and 108 to enable normal operation. However, in the case when the devices 102, 104, 106, and 108 are unable to receive the clock signals from the clock source 110, the devices can not operate normally, can only use their own clock frequency, and are unable to communicate with other devices.

SUMMARY OF THE INVENTION

The present invention provides a clock detecting circuit for detecting whether a clock source supplies a predetermined clock signal normally.

The present invention provides a clock providing apparatus to ensure normal operation of an electronic device when an external clock source fails to provide clock signals.

A clock detecting circuit includes a plurality of first transmission elements, a plurality of first exclusive OR gates, and a first AND gate. Each first transmission element is coupled to a last first transmission element for receiving output thereof and transmitting the received data to an input terminal of a next first transmission element according to a local clock signal. In addition, an input terminal of a first transmission element is coupled to the clock source to receive a predetermined clock signal of which a frequency is lower than a frequency of the local clock signal. Furthermore, a first input terminal and a second input terminal of a $k^{th}$ first exclusive OR gate are respectively coupled to output terminals of a $k^{th}$ first transmission element and a $(k+1)^{th}$ first transmission element, k being an integer larger than 0 and smaller than a total number of the plurality of first transmission elements.

In one embodiment of the present invention, the first transmission elements may be a plurality of first D flip-flops respectively including a clock terminal for receiving the local clock signal.

In addition, the clock detecting circuit provided in the present invention further includes a plurality of second D flip-flops respectively having a clock terminal for receiving the local clock signal. The second D flip-flops and the first D flip-flops are respectively triggered by a negative edge and a positive edge of the local clock signal. The clock detecting circuit of the present invention further includes a plurality of second exclusive OR gates, a second AND gate, and an OR gate. Each second D flip-flop is coupled to an output terminal of a last second D flip-flop for receiving output data thereof and transmitting the received data to an input terminal of a next second D flip-flop according to the local clock signal. In addition, an input terminal of a first second D flip-flop is coupled to the clock source for receiving the predetermined clock signal. Output terminals of a $k^{th}$ second D flip-flop and a $(k+1)^{th}$ second D flip-flop are respectively coupled to a first input terminal and a second input terminal of a $k^{th}$ second exclusive OR gate. Furthermore, all output terminals of the exclusive OR gates are coupled to the second AND gate and output terminals of the second AND gate and the first AND gate are respectively coupled to input terminals of the OR gate.

From another perspective, the present invention provides a clock providing apparatus for supplying an operating clock signal to an electronic device. The clock providing apparatus of the present invention includes a plurality of first transmission elements, a plurality of first exclusive OR gates, a first AND gate, and a multiplexer. Each first transmission element is coupled to a last first transmission element for receiving output thereof and transmitting the received data to an input terminal of a next first transmission element according to a local clock signal. In addition, an input terminal of a first transmission element is coupled to a clock source to receive a predetermined clock signal of which a frequency is lower than a frequency of the local clock signal. Furthermore, a first input terminal and a second input terminal of a $k^{th}$ first exclusive OR gate are respectively coupled to output terminals of a $k^{th}$ first transmission element and a $(k+1)^{th}$ first transmission element, k being an integer larger than 0 and smaller than a total number of the plurality of first transmission elements. The multiplexer is coupled to an external clock source and a local clock source and selects, according to an output from the first AND gate, one of the external clock source and the local clock source to be the operating clock signal for outputting to the electronic device.

The present invention uses the OR gate to detect a clock source pattern. Therefore, the present invention can accurately detect whether the clock source is operating normally. In addition, the clock providing apparatus further includes a multiplexer to respectively couple to the local clock source and the external clock source. Accordingly, in the case when the external clock source can not operate normally, the present invention uses the local clock source to provide to the electronic device.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
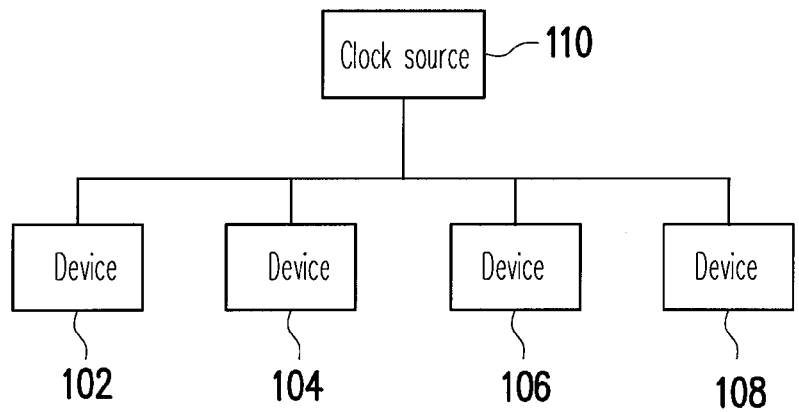
FIG. 1 illustrates a block diagram of a conventional system with a shared clock source.
Figure 2:
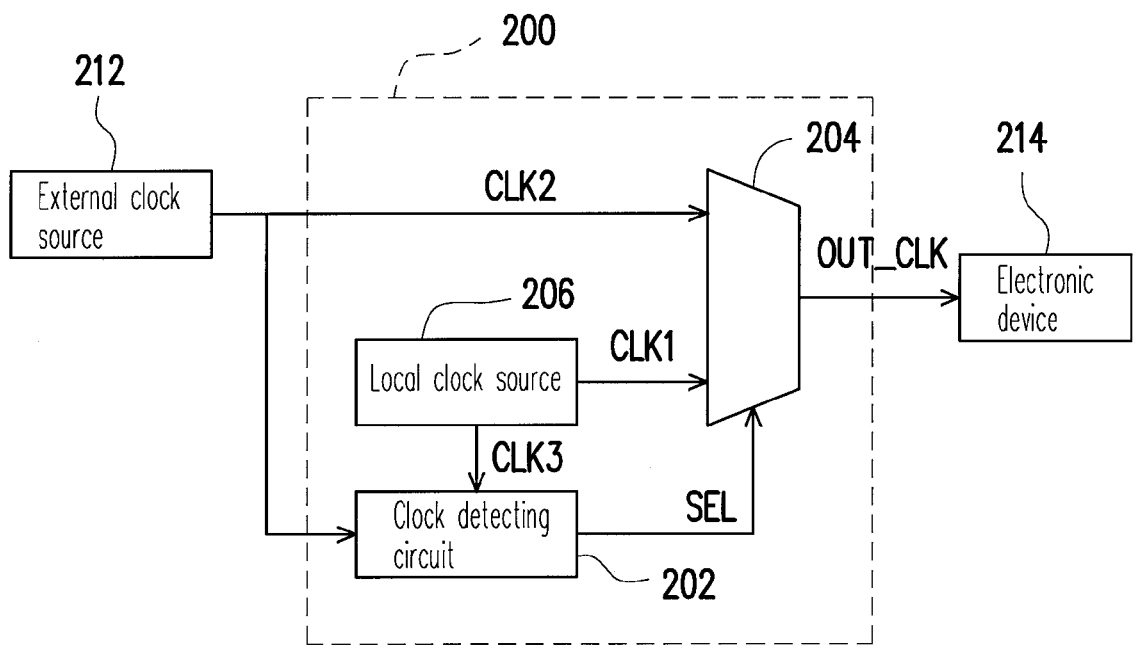
FIG. 2 illustrates a circuit block diagram of a clock providing apparatus according to one preferred embodiment of the present invention.

FIG. 2 illustrates a circuit block diagram of a clock providing apparatus according to one preferred embodiment of the present invention. Referring to FIG. 2, the present invention provides a clock providing apparatus 200 including a clock detecting circuit 202, a multiplexer 204, and a local clock source 206. The clock detecting circuit 202 is coupled to the multiplexer 204 and the local clock source 206. In addition, the clock detecting circuit 202 is also coupled to an external clock source 212. Similarly, an input terminal of the multiplexer 204 is also coupled to the local clock source 206 and the external clock source 212 and an output terminal of the multiplexer 204 is coupled to an electronic device 214.

The local clock source 206 outputs a local clock signal CLK1 and a sample clock signal CLK3. The external clock source 212 outputs an external clock signal CLK2 to the clock detecting circuit 202 and the multiplexer 204. In the present embodiment, a frequency of the sample clock signal CLK3 is higher than a frequency of the external clock signal CLK2. In other words, a cycle of the sample clock signal CLK3 is smaller than a cycle of the external clock signal CLK2. Accordingly, the clock detecting circuit 202 can perform sampling on the external clock signal CLK2 according to the sample clock signal CLK3 to detect whether the clock providing apparatus 200 receives the external clock signal CLK2 normally. In the present embodiment, a frequency of the sample clock signal CLK3 is twice of the frequency of the external clock signal CLK2. The local clock source 206 performs frequency division on the local clock signal CLK1 to generate the sample clock signal CLK3.

The clock detecting circuit 202 outputs a selection signal SEL to the multiplexer 204 according to a status of the external clock signal CLK2. Accordingly, the multiplexer 204 may select the external clock signal CLK2 or the sample clock signal CLK1 to be an operating clock signal OUT_CLK for the electronic device 214. In other words, suppose the sample clock signal and the external clock source received by the clock detecting circuit are respectively 16 MHz and 8 MHz, for example. The operating clock signal eventually provided to the electronic device is not the local clock signal but the local clock signal with half the frequency and the external clock source which are both 8 MHz. The local clock signal with half the frequency and the external clock source provided to the electronic device have the same frequency but the difference in the phases.

Figure 3:
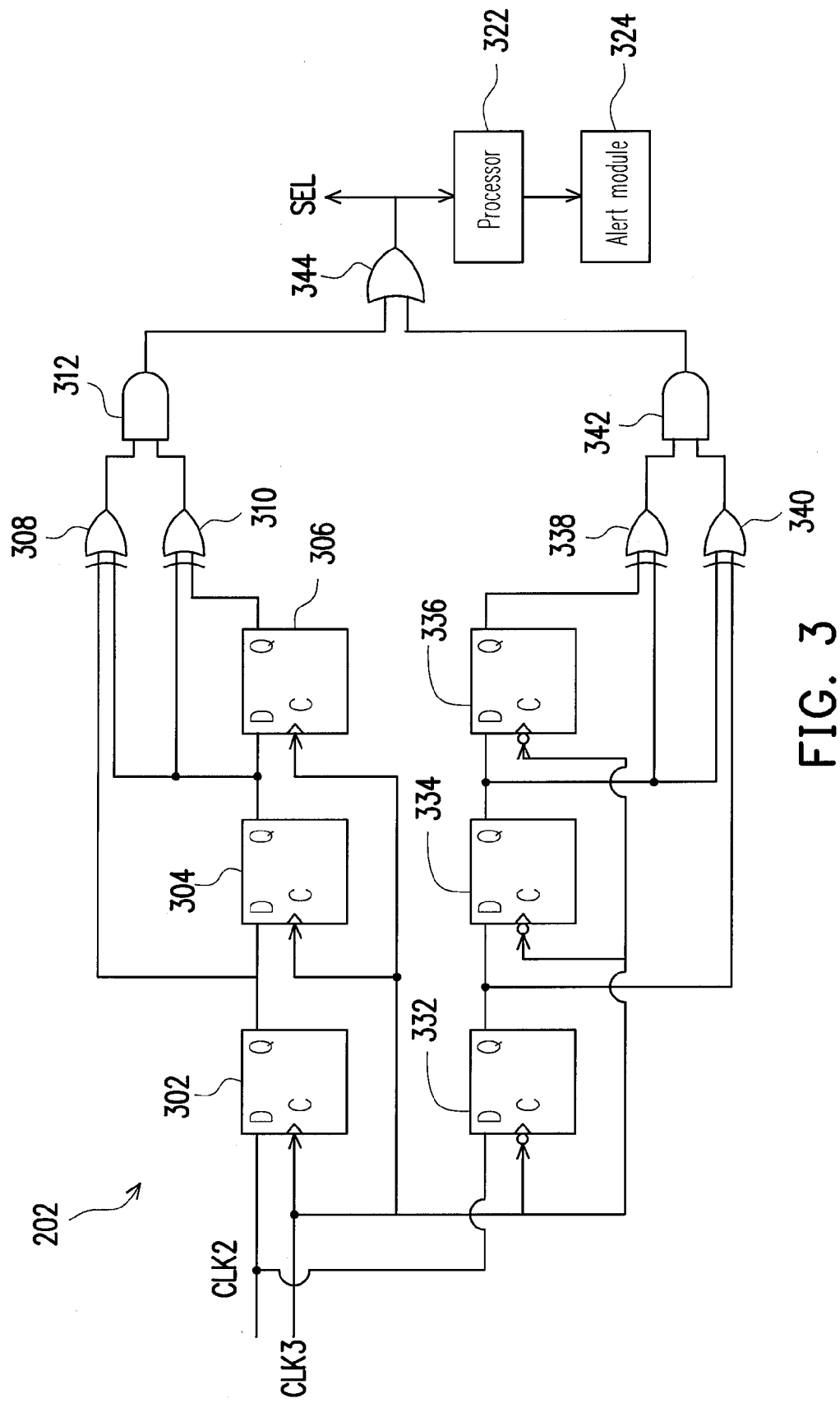
FIG. 3 illustrates a circuit diagram of a clock detecting circuit according to one preferred embodiment of the present invention.

FIG. 3 illustrates a circuit diagram of a clock detecting circuit according to one preferred embodiment of the present invention. Referring to FIG. 3, the clock detecting circuit 202 includes a plurality of first transmission elements, 302, 304, and 306, for example. Each first transmission element 302, 304, and 306 includes an input terminal D and an output terminal Q. The input terminals of the first transmission elements are coupled to the input terminal Q of a last first transmission element. The input terminal D of the first transmission element 302 receives the external clock signal CLK2.

In addition, the clock detecting circuit 202 further includes a plurality of exclusive OR gates 308 and 310, for example, and a first AND gate 312. Input terminals of a $k^{th}$ exclusive OR gate are respectively coupled to output terminals Q of a $k^{th}$ first transmission element and a $(k+1)^{th}$ first transmission element. k is a positive integer larger than 0 and smaller than a total number of the first transmission elements. For example, the input terminals of the first exclusive OR gate 308 are respectively coupled to the output terminal Q of the first transmission element 302 and the output terminal Q of the second first transmission element 304. Furthermore, input terminals of the first AND gate 312 respectively receive the input terminals of the exclusive OR gates 308 and 310.

In the present embodiment, each of the first transmission elements 302, 304, 306 may be implemented using a D flip-flop, which is not to be limited by the present invention herein. Furthermore, each of the D flip-flops 302, 304, and 306 respectively has a clock terminal C and receives the sample clock signal CLK3. Accordingly, each D flip-flop, according to a status of the sample clock signal CLK3, transmits a signal received from the input terminal D to the input terminal D of a next first transmission element through the output terminal Q. In the present embodiment, the D flip-flops 302, 304, and 306 are positive edge-triggered flip-flops.

The clock detecting circuit 202 further includes a processor 322 and an alert module 324. The processor 322 controls the alert module 324 to generate alert information or not according to the status of the selection signal SEL.

Figure 4:
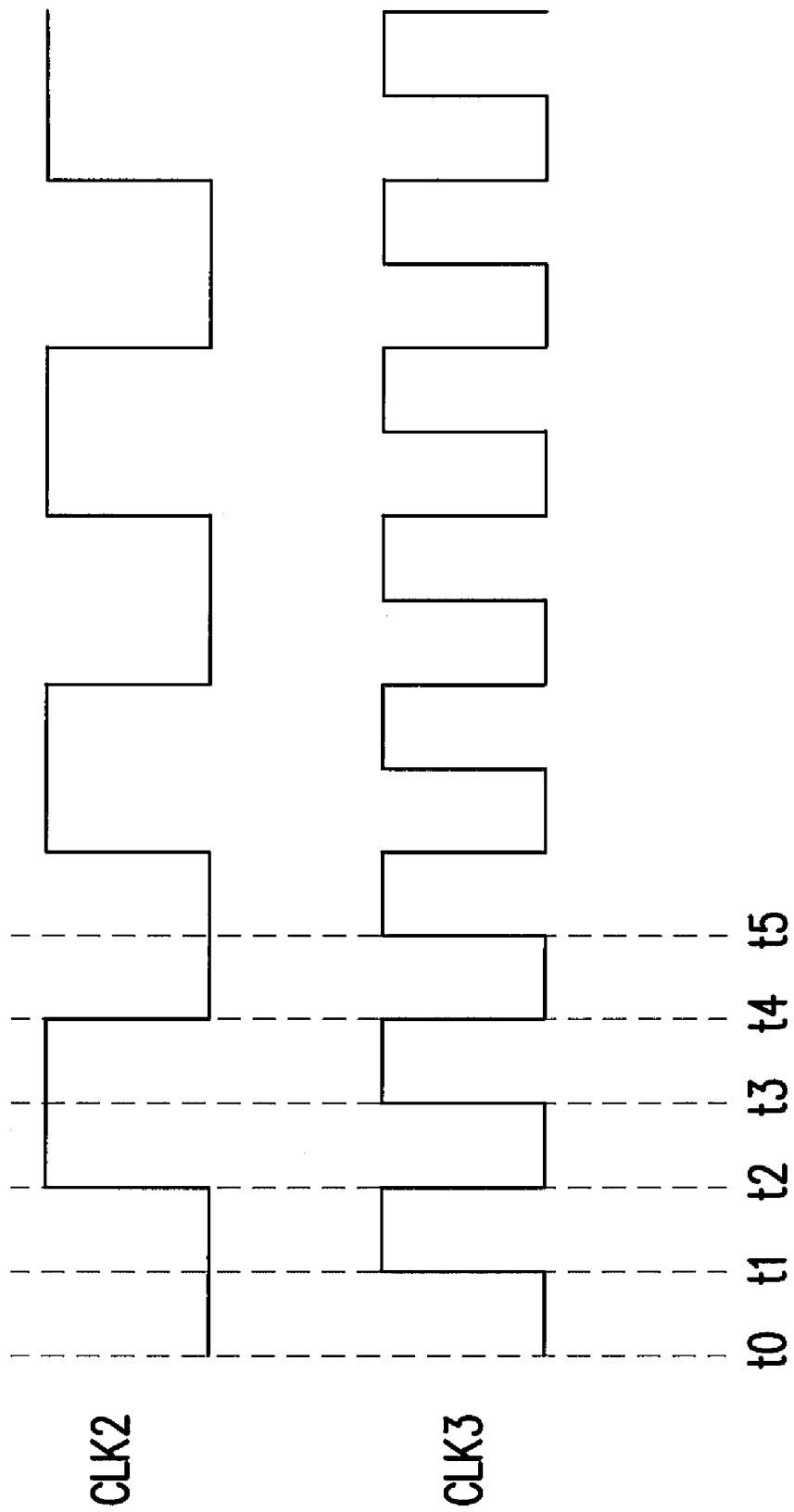
FIG. 4 illustrates a timing diagram of a local clock signal and an external clock signal according to a first embodiment of the present invention.

FIG. 4 illustrates a timing diagram of a local clock signal and an external clock signal according to the first embodiment of the present invention. Referring to both FIG. 3 and FIG. 4, in the present embodiment, suppose the sample clock signal CLK3 has twice the frequency of the external clock signal CLK2. Furthermore, suppose at time t0, the sample clock signal CLK3 and the external clock signal CLK2 are both at a low bit and are respectively transmitted to the clock terminal C and input terminal D of the first D flip-flop 302. However, the first D flip-flop 302 is positive-edge triggered so the status of the external clock signal CLK2 is latched to the input terminal D of the first D flip-flop 302.

At time t1, the sample clock signal CLK3 switches from a low bit to a high bit, resulting in a positive edge status on the local clock signal CLK2. As such, the first D flip-flop 302 outputs the status of the input terminal D from the output terminal Q to the input terminal D of the first D flip-flop 304. At this time, the status of the output terminal Q of the first D flip-flop 302 is a low bit and the statuses of the output terminals Q of the first D flip-flips 304 and 306 are unknown. Next, at time t2, the external clock signal CLK2 switches from a low bit to a high bit and the sample clock signal CLK3 switches from a high bit back to a low bit. At this time, the first D flip-flops 302 and 304 perform no operations.

At time t3, the sample clock signal CLK3 switches from low bit to high so that the first flip-flops 302 and 304 respectively transmit statuses of the input terminals to the next first D flip-flops. At this time, the statuses of the output terminals Q of the first D flip-flops 302 and 304 are respectively high and low bit and the status of the output terminal Q of the first D flip-flip 306 is unknown. At time t4, the sample clock signal CLK3 and the external clock signal CLK2 both switch from high back to a low bit so the first D flip-flops 302, 304, and 306 perform no operation.

Next, at time t5, the sample clock signal CLK3 switches again from a low bit to high. At this time, the first D flip-flops 302, 304, and 306 respectively output the statuses of the input terminals D from the output terminals Q. At this time, the statuses of the output terminals Q of the first D flip-flops 302, 304, and 306 are respectively low, high, and low bit. This also means that each input terminal of the exclusive OR gates 308 and 310 has a different status. Therefore, the input terminals of the exclusive OR gates 308 and 310 are at high statuses such that the status of the AND gate 312 is also at a high status. At this moment, the selection signal SEL may be a high status. Accordingly, the multiplexer 204 in FIG. 2 selects the external clock signal CLK2 as the operating clock signal OUT_CLK for the electronic device 214. In addition, the processor 322 also causes the alert module 324 to be in a disabled state because the selection signal SEL is at a high status.

On the contrary, if the external clock signal CLK2 is disabled, the status of the output of at least one of the exclusive OR gates 308 and 310 is at a low bit causing the status of the output of the AND gate 312 to also be at a low bit. At this time, the status of the selection signal SEL is also low so that the multiplexer 204 selects the local clock signal CLK1 to be the operating clock signal OUT_CLK for the electronic device 214. As such, the electronic device 214 does not halt because the external clock source 212 can not operate normally. On the other hand, the processor 322 may also control the alert module 324 to generate alert information for the user according to the fact that the selection signal SEL is at a low status. In the present embodiment, the alert information generated by the alert module 324 may be a sound or light.

Figure 5:
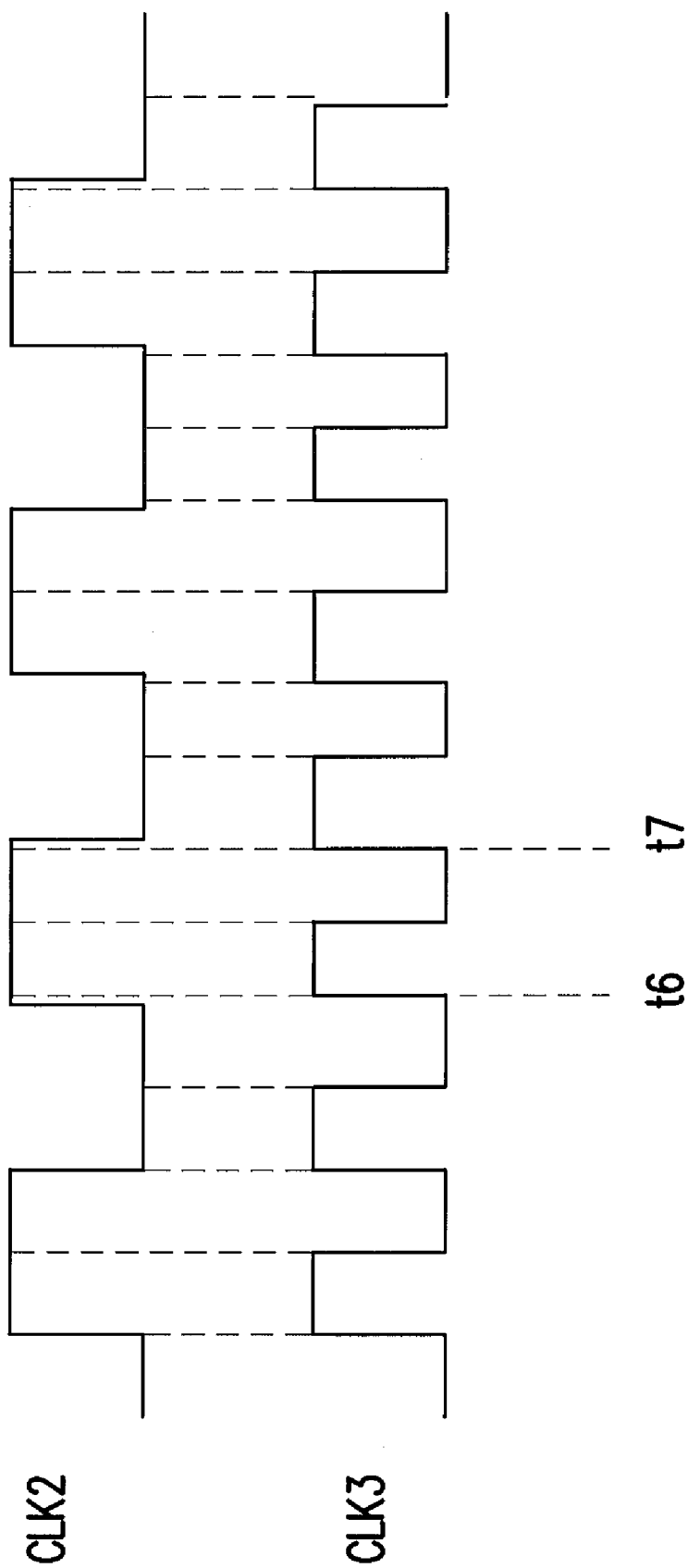
FIG. 5 illustrates a timing diagram of a local clock signal and an external clock signal according to a second embodiment of the present invention.

FIG. 5 illustrates a timing diagram of a local clock signal and an external clock signal according to a second embodiment of the present invention. Referring to FIG. 5, in some embodiments, the sample clock signal CLK3, possibly affected by noise or jitter, may cause the clock detecting circuit 202 to malfunction. For example, at time t6 and t7, the statuses of the sample clock signal CLK3 are both at a positive edge. However, the sampled external clock signals CLK2 are both at a high status. This means that the inputs of one of the exclusive OR gates 308 and 310 are the same, causing the output of the AND gate 312 to be low. At this time, the selection signal SEL also generates an incorrect status.

Referring to FIG. 3, to ensure the status of the selection signal SEL to be correct, in some embodiments, the clock detecting circuit 202 further includes a plurality of second transmission elements 332, 334, and 336, for example. The transmission elements 332, 334, and 336 may also be implemented with D flip-flops and the coupling method may be in reference to the transmission elements 302, 304, and 306. The difference lies in that in the present embodiment, the second D flip-flops 302, 304, 306 are negative-edge triggered.

Correspondingly, the clock detecting circuit 202 further includes a plurality of second exclusive OR gates 338 and 340, for example, and a second AND gate 342. Refer to the coupling relationship between the first exclusive OR gates 308 and 310 and the first AND gate 312 for the coupling method of the second exclusive OR gates 338 and 340 and the second AND gate 342, which shall not be further described at length herein. In addition, input terminals of the OR gate 344 are respectively coupled to input terminals of the AND gates 312 and 342.

The first D flip-flops 302, 304, and 306 and the second D flip-flops 332, 334, and 336 are respectively positive-edge triggered and negative-edge triggered. Therefore, even if phase or clock cycle drift occurs in the sample clock signal CLK3 due to noise or jitter, the clock detecting circuit 202 may still perform sampling on the external clock signal CLK2. For example, in FIG. 5, although the first D flip-flops 302, 304, and 306 may sample incorrectly, the second D flip-flops 332, 334, and 336 may still sample correctly due to the negative-edge triggering. In the present embodiment, as long as the output status of one of the AND gates 312 and 342 is correct, the OR gate 344 can output a correct selection signal SEL. As such, the selection signal SEL can be ensured to keep at a correct status.

Figure 6:
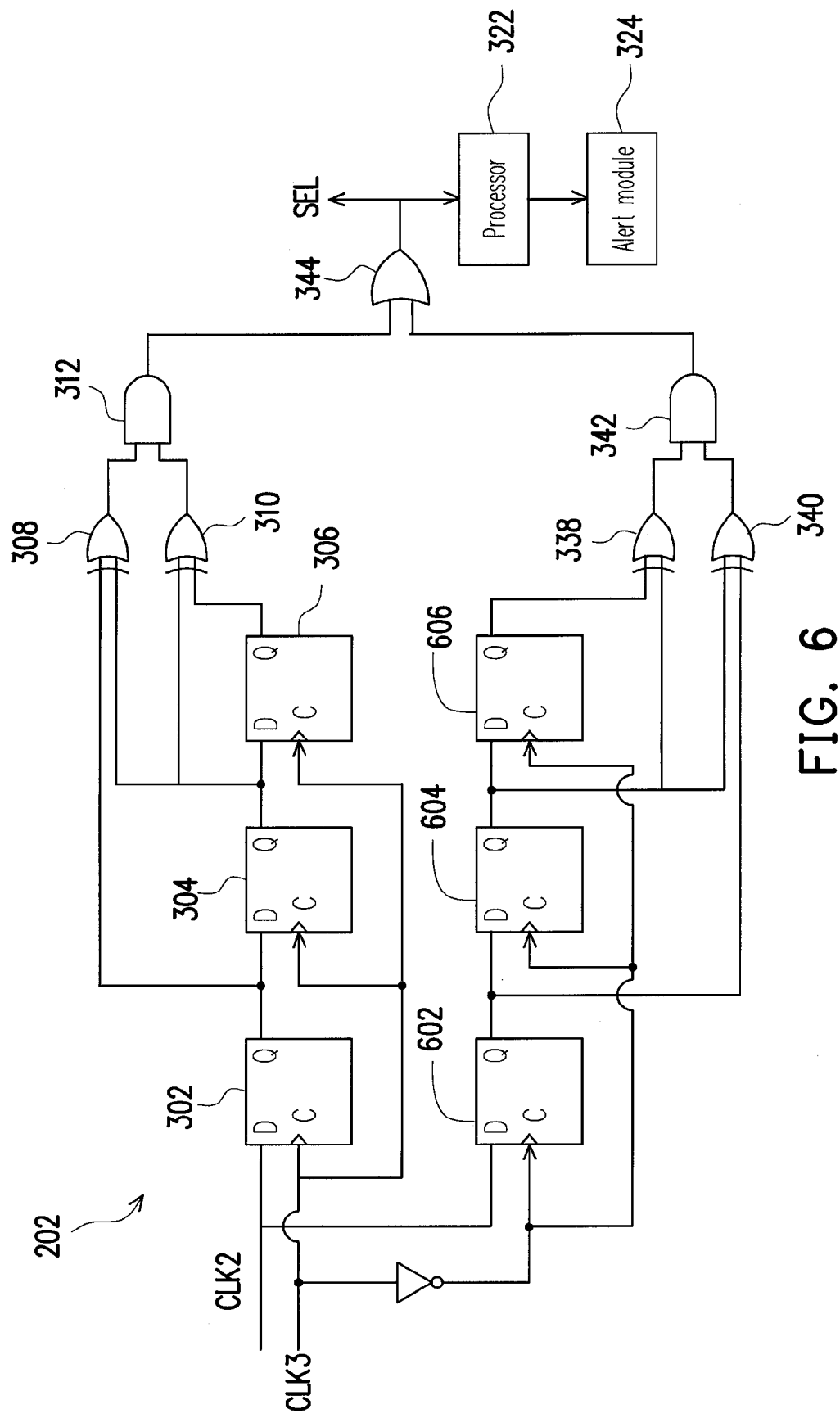
FIG. 6 illustrates a circuit diagram of a clock providing apparatus according to another embodiment of the present invention.

FIG. 6 illustrates a circuit diagram of a clock providing apparatus according to another embodiment of the present invention. Referring to FIG. 6, the difference between the present embodiment and the embodiment of FIG. 3 lies in the following. The present embodiment uses D flip-flops 602, 604, and 606 to replace the D flip-flops 332, 334, and 336 as the second transmission elements. The D flip-flops 602, 604, and 606 are positive-edge triggered. In the present embodiment, the clock detecting circuit 202 further includes an inverter 608 of which an input terminal is coupled to a clock terminal of the D flip-flop 302 to receive the sample clock signal CLK3 and an output terminal is coupled to clock terminals C of the D flip-flops 602, 604, and 606. As such, the clock detecting circuit 202 provided in the present embodiment may also have the same functions as the clock detecting circuit 202 in FIG. 3.

In summary, the present invention uses D flip-flops to sample an external clock signal and make determination on the pattern using exclusive OR gates. Accordingly, the present invention can accurately detect a status of the external clock signal. In addition, the present invention further includes a multiplexer and selects the external clock signal or a local clock signal to be an operating clock signal according to a selection signal. Therefore, the present invention enables the electronic device to maintain normal operation when the external clock signal is disabled.

Furthermore, positive-edge triggered and negative edge triggered D flip-flops are disposed in the present invention so erroneous operations caused by noise or jitter of the local clock signal can be prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A clock detecting circuit, suitable for detecting whether a clock source supplies a predetermined clock signal normally, comprising:
   a plurality of first transmission elements, wherein each of the plurality of first transmission elements is coupled to a last first transmission element for receiving output data thereof, a received data is transmitted to an input terminal of a next first transmission element according to a sample clock signal, an input terminal of the first one of the plurality of first transmission elements is coupled to the clock source for receiving the predetermined clock signal, and a frequency of the predetermined clock signal is lower than a frequency of the sample clock signal;
   a plurality of first exclusive OR gates, wherein a first input terminal and a second input terminal of a kth first exclusive OR gate are respectively coupled to output terminals of a kth first transmission element and a (k+1)th first transmission element, k being an integer larger than 0 and smaller than a total number of the plurality of first transmission elements; and
   a first AND gate, receiving outputs from the plurality of first exclusive OR gates.

2. The clock detecting circuit according to claim 1, wherein the plurality of first transmission elements are a plurality of D flip-flops each having a clock terminal for receiving the sample clock signal.

3. The clock detecting circuit according to claim 2, wherein each of the plurality of first D flip-flops is triggered by a positive edge of the sample clock signal and transmits the received data to a next first D flip-flop.

4. The clock detecting circuit according to claim 1, further comprising:
   a plurality of second D flip-flops, wherein each of the plurality of second D flip-flops has a clock terminal for receiving the sample clock signal, is coupled to an output terminal of a last second D flip-flop for receiving output data thereof, and the received data is transmitted to an input terminal of a next second D flip-flop according to the sample clock signal, and an input terminal of a first second D flip-flop of the plurality of second D flip-flops is coupled to the clock source for receiving the predetermined clock signal;
   a plurality of second exclusive OR gates, wherein a first input terminal and a second input terminal of a kth second exclusive OR gate are respectively coupled to output terminals of a kth second D flip-flop and a (k+1)th second D flip-flop;
   a second AND gate, receiving outputs from the plurality of second exclusive OR gates;
   an OR gate, receiving outputs of the first AND gate and the second AND gate;
   a processor, coupled to an output of the OR gate; and
   an alert module, coupled to the processor,
   wherein the processor decides whether to control the alert module to issue alert information according to a status of the OR gate.

5. The clock detecting circuit according to claim 4, wherein each of the plurality of second D flip-flops is triggered by a negative edge of the sample clock signal and transmits the received data to a next second D flip-flop.

6. The clock detecting circuit according to claim 4, further comprising an inverter having an input terminal receiving the sample clock signal and an output terminal coupled to the clock terminals of the plurality of second D flip-flops.

7. A clock providing apparatus, suitable for providing an operating clock signal for an electronic device, comprising:
   a plurality of first transmission elements, wherein each of the plurality of first transmission elements is coupled to a last first transmission element for receiving output data thereof, a received data is transmitted to an input terminal of a next first transmission element according to a sample clock signal, an input terminal of the first one of the plurality of first transmission elements is coupled to an external clock source, and a frequency of the external clock source is lower than a frequency of the sample clock signal;
   a plurality of first exclusive OR gates, wherein a first input terminal and a second input terminal of a kth first exclusive OR gate are respectively coupled to output terminals of a kth first transmission element and a (k+1)th first transmission element, k being an integer larger than 0 and smaller than a total number of the plurality of first transmission elements;
   a first AND gate, receiving outputs from the plurality of first exclusive OR gates; and
   a multiplexer, coupled to the external clock source and a local clock source, wherein according to an output of the first AND gate, the multiplexer selects one of the external clock source and the local clock source to be the operating clock signal for outputting to the electronic device, and the frequency of the external clock source is equal to the frequency of the local clock source.

8. The clock providing apparatus according to claim 7, wherein the plurality of first transmission elements are a plurality of D flip-flops each having a clock terminal for coupling to the sample clock source.

9. The clock providing apparatus according to claim 8, wherein each of the plurality of first D flip-flops is triggered by a positive edge of the clock signal and transmits the received data to a next first D flip-flop.

10. The clock providing apparatus according to claim 7, further comprising:
    a plurality of second D flip-flops, wherein each of the plurality of second D flip-flops has a clock terminal coupled to the sample clock terminal, is coupled to an output terminal of a last second D flip-flop for receiving output data thereof, and the received data is transmitted to an input terminal of a next second D flip-flop according to a signal of the sample clock terminal, and an input terminal of a first second D flip-flop of the plurality of second D flip-flops is coupled to the external clock source;
    a plurality of second exclusive OR gates, wherein a first input terminal and a second input terminal of a kth second exclusive OR gate are respectively coupled to output terminals of a kth second D flip-flop and a (k+1)th second flip-flop, k being an integer larger than 0 and smaller than a total number of the plurality of first transmission elements;
    a second AND gate, receiving outputs from the plurality of second exclusive OR gates; and
    an OR gate, receiving outputs of the first AND gate and the second AND gate, wherein an output of the OR gate is coupled to the multiplexer to control the multiplexer to select one of the external clock source and the local clock source to be the operating clock signal for the electronic device.

11. The clock providing apparatus according to claim 10, wherein each of the plurality of second D flip-flops is triggered by a negative edge of the clock signals to transmit the received data to a next second D flip-flop.

12. The clock detecting circuit according to claim 10, further comprising an inverter having an input terminal receiving the local clock signal and an output terminal coupled to clock terminals of the plurality of second D flip-flops.

* * * * *